United States Patent [19]

Schwarz et al.

[11] Patent Number: 5,472,763

[45] Date of Patent: Dec. 5, 1995

[54] RECYCLABLE CARPET FLOOR COVERING

[75] Inventors: Gerhard Schwarz, Hanau; Manfred Weber, Glashütten, both of Germany

[73] Assignee: Hoechst Aktiengesellschaft, Germany

[21] Appl. No.: 148,649

[22] Filed: Nov. 1, 1993

[30] Foreign Application Priority Data

Nov. 4, 1992 [DE]  Germany .......................... 42 37 199.6

[51] Int. Cl.$^6$ ...................................... D06N 7/00
[52] U.S. Cl. .................................. 428/95; 428/97
[58] Field of Search ........................ 428/95, 97

[56] References Cited

U.S. PATENT DOCUMENTS

| | | | |
|---|---|---|---|
| 3,779,993 | 12/1973 | Kibler et al. | 524/603 |
| 3,941,904 | 3/1976 | Hoh et al. | 427/207 |
| 4,154,918 | 5/1979 | Buxbaum et al. | 528/176 |

FOREIGN PATENT DOCUMENTS

| | | |
|---|---|---|
| 0511469A1 | 11/1992 | European Pat. Off. . |
| 0529575 | 3/1993 | European Pat. Off. . |
| 0536670A1 | 4/1993 | European Pat. Off. . |
| 0547533A1 | 6/1993 | European Pat. Off. . |
| 1455091 | 11/1976 | United Kingdom . |
| 2097005 | 10/1982 | United Kingdom . |
| WO93/12285 | 6/1993 | WIPO . |

*Primary Examiner*—Frederick Krass
*Attorney, Agent, or Firm*—Connolly & Hutz

[57] ABSTRACT

There is described a recyclable carpet floor covering comprising a backing, a tied-in pile yarn and a back finish with or without a secondary backing adhered to the (primary) backing, wherein the pile yarn, the (primary) backing and a secondary backing comprise polyester fibers and the back finish for the (primary) backing and for adhering a secondary backing comprises a consolidating and adhering composition comprising a combination of 10–70% by weight of a water-soluble or -dispersible first polyester A, and 90–30% by weight of a water-insoluble second polyester B, There are further described a process for producing the recyclable carpet floor covering and also an aqueous preparation of the consolidating and adhering composition comprising the polyesters A and B and the use thereof for consolidating the carpet floor coverings and optionally adhering them to secondary backings.

18 Claims, No Drawings

RECYCLABLE CARPET FLOOR COVERING

DESCRIPTION

The present invention relates a recyclable carpet floor covering comprising a backing, a tied-in pile yarn and a back finish, wherein the pile yarn and the backing comprise normal or low flammability polyester fibers and the back finish comprises a polyester mixture.

Carpets for the purposes of the present invention are textile sheet materials produced in various ways by hand or machine which consist of a backing—also called a base or ground fabric—and a pile layer, which is important for the use, and are predominantly used as floor covering. The backing of the carpets is a web-, weave- or hit-like sheet material, into which are tied tufts or loops of pile yarns which stand upright from the plane of the backing on one side thereof. The manner of production and the resulting differences in the tying of the pile yarns into the backing is the basis for distinguishing various kinds of carpet, for example knotted carpets, which can be produced manually or mechanically, hand- or machine-woven carpets, knitted carpets, for example Raschel or warp-knitted carpets, tufted carpets and needlefelt constructions. Common to all these carpet constructions is that the pile threads are tied into the backing, or ground, and pass through it, i.e. that the pile yarns are somehow interlaced with the yarns of the backing in a manner dictated by the carpetmaking process. It is true that this tying of the pile yarns into the backing leads to some attachment of the pile material to the backing, but is generally not sufficient to confer on the carpet floor covering the stability required for sustained use, in particular tuft anchorage, i.e. the resistance of the pile yarns to pulling out of the backing. It is therefore customary to finish and/or coat said carpet materials from the back in order that the use characteristics of the carpet, in particular the tuft anchorage, but also the carpet hand, may be adapted to the requirements of sustained use and to user expectations.

The back coating of these known carpet constructions generally takes the form of a precoat with suitable known latices, followed directly either by lamination with a secondary backing or, after intermediate drying, by the main coating, preferably a coating with a foamed latex. Known carpet constructions, as mentioned earlier, generally contain different chemical substance groups for the pile, the backing and the coating. They are therefore not a single-species product and can be recycled only after complicated separating operations, if at all.

However, the disposal and recycling of plastics parts, in particular in the automotive sector, has become a crucial issue. Many concepts for recovering and reusing plastics waste have already been developed. However, there are problems with the recycling of composite systems such as synthetic fiber carpets where the individual components are made of different polymers. From this aspect there have been attempts to arrive at constructions made completely of one kind of material.

However, the restriction to a single kind of material generally led to a restriction in the achievable technical performance characteristics of the products produced therefrom.

The present invention, then, provides a recyclable carpet floor covering of high utility due to excellent dimensional stability, high tuft anchorage due to improved binding-in of the pile, and advantageous hand. It is further notable for soil resistance/cleanability, abrasion resistance, light fastness through the use of appropriate dyes and dyeing guidelines, wet and dry rub fastness and hence extended replacement times. With a suitable, below-described primary backing construction the carpet of the invention exhibits improved thermoformability.

When the time does come to replace the carpet floor covering there are no problems, since the carpet is satisfactorily recyclable owing to its construction from polyester material alone. Recycling can be for example by methanolysis or by regranulation. In methanolysis, the monomeric starting materials required for producing the polyesters, namely the methyl esters of the dicarboxylic acid units and the diol components, are, if necessary after removal of additives such as fillers, delusterants and dyes, recovered, separated by distillation and then recondensed to form new polyesters. Regranulation leads in one step directly to respinnable polyester material.

The recyclable carpet floor covering of the invention comprises a backing, a tied-in pile yarn and a back finish and in it the pile yarn, the (primary) backing and a secondary backing comprise polyester fibers and the back finish for the (primary) backing and for adhering a secondary backing comprises a consolidating and adhering composition comprising a combination of (calculated solid on solid)

10–70% by weight, preferably 15–30% by weight, of a water-soluble or -dispersible first polyester A, and 90–30% by weight, preferably 85–70% by weight, of a water-insoluble second polyester B, wherein the water-soluble or -dispersible polyester A conforms to the formula I

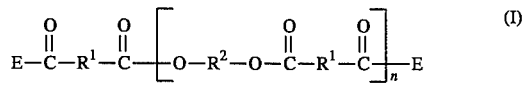

where $R^1$ is on average 25–90mol % o-, m- or p-phenylene, preferably m- or p-phenylene, 10–25 mol % groups of the formulae II or III

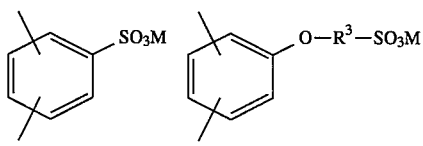

where $R^3$ is o-, m- or p-phenylene or straight-chain or branched alkylene of 2–6, preferably 2–4, in particular 3, carbon atoms, and 0–50 mol % straight-chain or branched alkylene of 1–6, preferably 3–6, carbon atoms and/or cyclohexylene radicals, $R^2$ is on average 50–100 mol % radicals of the formula IV

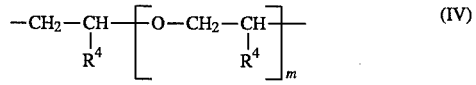

where $R^4$ is hydrogen or methyl and m is 1 or 2, 0–50 mol % alkylene radicals of 2–6 carbon atoms, and 0–20 mol % polyoxyalkylene radicals of the formula IV where $R^4$ is hydrogen or methyl and m is a number corresponding to a number average molecular weight of the polyoxyalkylene radical of up to 2000, E is hydroxyl, alkoxy of 1–4 carbon atoms or the radical —O—R²OH, M is hydrogen or a lithium, sodium or potassium atom or an ammonium group, n is such that the apparent average molecular weight, measured in a vapor pressure osmometer in dimethylformamide as the solvent, is from 1000 to 12,000, preferably from 1000 to 5000, and the water-insoluble polyester B conforms to the formula V

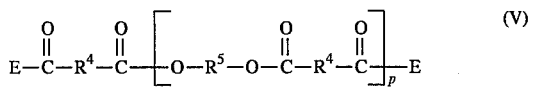

where $R^4$ is on average 50–100 mol % o-, m- or p-phenylene, preferably m- or p-phenylene, and 0–50 mol % straight-chain or branched alkylene of 1–6, preferably 3–6, carbon atoms and/or cyclohexylene radicals, $R^5$ is on average 30–100 mol % radicals of the formula VI

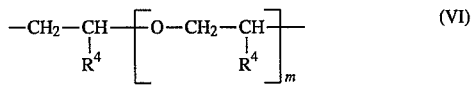

where $R^4$ is hydrogen or methyl and m is 1 or 2, and 0–70 mol % alkylene radicals of 2–6 carbon atoms and/or radicals of the formula VII

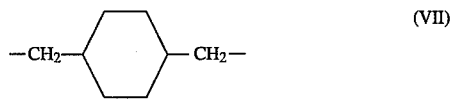

and 0–20 mol % of polyoxyalkylene radicals of the formula IV where $R^4$ is hydrogen or methyl and m is a number corresponding to a number average molecular weight of the polyoxyalkylene radical of up to 2000, E is hydroxyl, alkoxy of 1–4 carbon atoms or the radical —O—R²—OH, and p is such that the second polyester has a melt index of 110–130° C.

As specified above, the symbols $R^1$ to $R^5$ each represent a small number of different groups. This means that, in the formulae I to IV, in which these symbols are used, a symbol represents one group from the above definition at a time. Since the compounds defined by the formulae I to IV are relatively large molecules in which these symbols occur repeatedly, the symbol may each time represent the same group or the symbols can denote different radicals from the above definition. This may be further explained with an example. If, for example, a polyester A contains 60 mol % of o-, m- or p-phenylene radicals, it may contain for example n mol % of m-phenylene radicals and (60-n) mol % of p-phenylene radicals. Alkylene radicals for the purposes of the present invention are bivalent radicals of straight-chain or branched alkanes, in which the two free bonds are not on the same carbon atom. Preferably the bonds are either on adjacent carbon atoms or on the terminal carbon atoms of the alkane chain, in the case of branched chains accordingly on the end members of the longest continuous chain.

A particularly preferred water-soluble or readily water-dispersible polyester A is one where $R^1$ is m- and/or p-phenylene and 5-sulfo-1,3-phenylene and $R^2$ is ethylene, a radical of the formula IV where $R^4$=hydrogen and m=1 and/or 2,2-dimethyl-1,3-propylene.

A commercial product suitable for use as the water-soluble or readily water-dispersible polyester A is for example the copolyester marketed by Hoechst AG as sizing agent T 3513.

A particularly preferred group of the formula III is one in which $R^3$ is 1,3-propylene.

A particularly preferred water-insoluble polyester B is one in which $R^4$ is p-phenylene and $R^5$ is ethylene, a radical of the formula VII or polyoxyethylene.

As described above, in the case of woven and Raschel warp-knitted carpets the (primary) backing can take the form of a ground warp-filling construction and in the case of tufted carpets and needlefelt constructions the (primary) backing can be incorporated into the gross structure as a separate woven, spunbonded or web product.

If the primary backing is a woven fabric or a weave-analogous construct, it advantageously has from about 60 to 150 warp threads and from 80 to 165 filling threads per 10 cm. Other primary backing constructions preferably have a corresponding thread density. A woven or knitted primary backing comprises staple or continuous filament fiber yarns having counts from Nm 6 to Nm 20, preferably from Nm 12 to Nm 14. The yarns are made of fibers having a linear density from 2 to 30 dtex, preferably from 3 to 8 dtex, and a staple length from 80 to 150 mm. In the case of continuous filament yarns the yarn count or yarn linear density is in the same range as for staple fiber yarns. Particular preference is given to recyclable carpets according to the invention which have tufted construction in which the primary backing is a polyester nonwoven or a polyester weave, preferably with a basis weight from 80 to 200 g/m².

The weight proportions of pile material, primary backing and finish in the recyclable carpet floor covering of the invention are from about 150 to 2000 g/m², preferably from 400 to 600 g/m² of pile material, from 80 to 200 g/m² of primary backing and from 20 to 800 g/m², preferably from 200 to 400 g/m², of consolidating and adhering composition.

A secondary backing optionally laminated onto the carpet of the invention is preferably a polyester nonwoven having a basis weight from 20 to 450 g/m², in particular a nonwoven composed of staple or continuous filament fibers from 2 to 30 dtex, preferably from 3.0 to 8.0 dtex, in linear density and consolidated by needling, autogenously thermally or hot-melt adhesive, for example a spunbonded. An example of a nonwoven that is highly suitable for use as a secondary backing is the commercial spunbonded type 001 from Hoechst AG.

If the consolidating and adhering composition also serves to adhere the carpet to a secondary backing, it is advantageous to use an amount thereof which is in the upper part of the above-specified range. Otherwise the skilled person selects the amount to be applied within the above limits according to the properties desired of the caret. A small amount is used for a rather textile material, while a larger amount is used for a markedly stiffened material.

The polyester base material for the staple or continuous filament fiber yarns of a pile and primary backing of the recyclable carpet of the invention and for the filaments of any nonwovens present therein can in principle be any known type suitable for fibermaking. Such suitable polyesters are made predominantly, i.e. to more than 75 mol %, of units derived from aromatic dicarboxylic acids and from aliphatic diols. Widely used aromatic dicarboxylic acid units are the bivalent radicals of benzenedicarboxylic acids, in particular of terephthalic acid and of isophthalic acid widely used diols have 2–4 carbon atoms, and ethylene glycol is particularly suitable. Of particular advantage are carpets according to the invention whose fibers comprise a polyester material which is at least 85 mol % polyethylene terephthalate. The remaining at most 15 mol % are made of dicarboxylic acid units and glycol units which act as modifiers and which make it possible for the skilled person to control the physical and chemical properties of the resulting filaments in a specific manner. Examples of such dicarboxylic acid units are radicals of isophthalic acid or of aliphatic dicarboxylic acids such as glutaric acid, adipic acid, sebacic acid, sulfo-containing dicarboxylic acids, e.g. 5-sulfoisophthalic acid, which provide the polyester with an affinity for cationic dyes and the flame-retardant comonomers of the formula VIII:

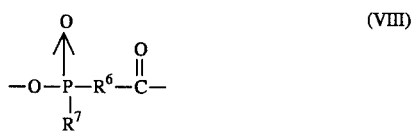
(VIII)

where $R^6$ is alkylene or polymethylene having 2 to 6 carbon atoms or phenyl and $R^7$ is alkyl having 1 to 6 carbon atoms, aryl or aralkyl.

Preferably, in the formula VIII, $R^6$ is ethylene and $R^7$ is methyl, ethyl, phenyl or o-, m- or p-methylphenyl, in particular methyl.

A particularly preferred modifying aliphatic dicarboxylic acid is adipic acid.

Preferred, modification-effective additaments of the aliphatic dicarboxylic acid are within the range 5–10% by weight.

If an effective flameproofing effect is desired, the amount of flame retardants of the formula VIII incorporated in the fiber raw material or fibers is from 0.1 to 20% by weight, preferably from 2.5 to 12% by weight, based on the total weight of the fibers or filaments.

Examples of modifying diol radicals are longer-chain diols, for example of propanediol, dimethylpropanediol or butanediol, of di- or triethylene glycol or, if present in a small amount, of polyglycol having a molecular weight of about 500–2000.

Preference for the polyester yarns of the carpet and for the load-bearing filaments of nonwovens present therein is given to unmodified polyethylene terephthalate, while the fusible binders which are used, preferably in the form of fibers, for consolidating the nonwovens are polyesters having a reduced melting point. These consist advantageously of modified polyethylene terephthalate, for example polyethylene terephthalate modified by polyethylene glycol or of polybutylene terephthalate. Similarly, filaments made of polyethylene terephthalate which has been modified with the abovementioned comonomer of the formula VIII can be used with advantage as fusible bonding fibers.

The polyesters present in the yarns of the carpets of the invention preferably have a molecular weight corresponding to an intrinsic viscosity (IV) measured in a solution of 1 g of polymer in 100 ml of dichloroacetic acid at 25° C., from 0.7 to 1.4.

A particularly preferred carpet yarn which can be used with particular advantage for producing the pile and the primary backing of the carpet floor covering of the invention consists for example of a fiber material of the brand ®Trevira, in particular of the brand ®Trevira type 824 from Hoechst AG.

A fiber material which has been modified with phosphonic acid groups and can be used for producing low flammability yarns is available from Hoechst AG under the name ®Trevira CS.

The recyclable carpet floor covering of the invention may of course also be colored, e.g. dyed in a single color or patterned.

It can be of advantage to adapt the color of the primary backing to that of the pile material, i.e. to use a dark primary backing when the pile has a dark design too. The coloring of the carpet can be effected in any known manner. For instance, the carpet can be dyed in the winch beck at the boil with or, preferably, without a carriers continuous dyeing is possible; superatmospheric pressure dyeing by the HT process is possible; or a version of the thermosol process that is suitable for carpet dyeing can be used.

Patterned carpets can be obtained by printing, spraying or otherwise applying color locally to the pile side of the carpet and subsequent fixation of the dye. The fixation of the dyes is effected as a function of the structure of the dyes and of the nature of the polyester raw material of the fibers. In the case of polyester materials which contain acid groups, for example sulfo groups, in the polymer chain and where cationic dyes are used, the fixation takes place even in the course of the action of a hot aqueous dye preparation on the fibers, presumably due to binding of the dyes to the acid groups. If use is made of disperse dyes and polyesters which do not contain any acid groups, the fixation is generally effected by subjecting the fiber brought into contact with the dye preparation to a heat treatment. However, the production of colored carpets can of course also be effected by starting from pre-dyed pile and/or primary backing yarns. The yarn dyeing can here likewise be carried out according to any known method, in particular according to the HT process. With particular advantage it is also possible to use yarns which have been spun-dyed with pigments.

The recycling of the carpets according to the invention by methanolysis is not significantly impaired by the color of the polyester material, if at all. Recycling by regranulation leads in the case of colored carpets to correspondingly colored regranulate, which can be further processed into sectors in which the color of the polymer is immaterial or even desired.

To obtain particular effects the carpet floor covering of the invention may contain yarns or filaments in the pile and/or in the primary backing which are not made of polyester, provided they are present in such a small amount or are sufficiently compatible with the polyester material that they do not impair the recyclability of the carpet.

For instance, it is possible to admix the pile and/or primary backing yarn with carbon filaments to enhance the electrical conductivity of the carpet.

The present invention further provides a preparation of a polyester-based consolidating and adhering agent for back consolidation of recyclable polyester carpets and/or for adhering the same to a secondary backing, of the following composition:

from 10 to 70 parts by weight, preferably from 15 to 30 parts by weight, of a water-soluble or readily water-dispersible polyester A GW parts by weight of water, GW being given by the formula

GP·0.66≦GW≦GP·5.0 wherein

GP is the amount of polyester A in parts by weight,

GL parts by weight of a water-miscible organic solvent, GL being given by the formula 0≦GL≦0.3·GP, from 90 to 30 parts by weight, preferably from 85 to 70 parts by weight, of a water-insoluble polyester B, where the polyesters A and B have the compositions specified above.

Water-miscible organic solvents which can be present in this preparation include alkanols or alkanediols having from 1 to 8, preferably from 4 to 6, carbon atoms, e.g. isobutanol or 1,4-butanediol, di- or triethylene glycol or aprotic linear or cyclic carboxamides such as dimethylformamide, dimethylacetamide or N-methylpyrrolidone.

This preparation may if desired be adjusted to a pH from 4 to 7 in a conventional manner by addition of small amounts of known buffer mixtures.

To apply the preparation to the carpet backing by spraying, brushing or foaming, but preferably by kiss roll padding, the viscosity of the preparation is set either by varying the weight ratio of polyesters A and B or by addition of known thickeners, for example alginates or polyacrylic acid derivatives, to a viscosity from 500 to 10,000 mPa·s, preferably in the case of padding to 1500–3000 mPa·s or in the case of knife-coating to 6000–8000 mPa·s.

However, if the preparation is to be applied to the carpet floor covering by knife-coating, the preparation can also be adjusted to a pasty consistency by addition of, for example, said thickeners. This generally requires from 0.5 to 5.0% by weight, based on the weight of the preparation, of thickener.

The preparation of the invention may additionally contain additives, for example antimigration agents, emulsion stabilizers, fillers or pigments or the like in a proportion of up to 15, preferably up to 10, % by weight of the total mixture.

Particular preference is given to those preparations comprising polyesters A and B having one or more of the abovementioned preferred features.

This invention further provides for the use of the above-described preparation for consolidating carpet floor coverings and optionally their adhesion to a secondary backing.

The present invention also provides a process for producing a recyclable carpet floor covering by first using one of the known knotting, weaving, warp-knitting, tufting or needlefelt processes to produce from polyester yarns an unconsolidated carpet floor covering comprising a backing and tied-in pile yarns, cropping, if a velour material is to be produced, optionally coloring in a conventional manner and then washing to remove existing spin finishes, which comprises then applying from the back by spraying, brushing or foaming, with or without the addition of a foamer to the preparation, but preferably by kiss roll padding or knife-coating a consolidating and adhering preparation of the following composition:

from 10 to 70 parts by weight, preferably from 15 to 30 parts by weight, of a water-soluble or readily water-dispersible polyester A GW parts by weight of water, GW being given by the formula $$GP \cdot 0.66 \leq GW \leq GP \cdot 5.0,$$

wherein

GP is the amount of polyester A in parts by weight,

GL parts by weight of a water-miscible organic solvent, GL being given by the formula $0 \leq GL \leq 0.3 \cdot GP$, from 90 to 30 parts by weight of a water-insoluble polyester B, where the polyesters A and B have the compositions specified above.

The viscosity of this polyester preparation is adjusted in such a way as to ensure good penetration of the carpet backing. This is in general achieved when the viscosity of the preparation is within the range from 500 to 10,000 mPa·s at the working temperature. The polymer preparation is normally applied at temperatures from 5 to 40° C., preferably at room temperature. The amount of preparation applied is adjusted in such a way as to produce, based on solids, a polyester add-on from 20 to 800 g/m².

After the polyester preparation has been applied, the back of the carpet may additionally have applied to it a secondary backing which is then pressed in place, for example by calendering. Subsequently the carpet is dried at temperatures from 80° to 140° C., the polyester resin of the polyester preparation being bound completely into the carpet backing either in the course of the drying operation or in a subsequent heat treatment step at 140°–180° C. to end-consolidate the carpet backing.

In an alternative embodiment of the above-described process the rearward application of the polyesters A and B is carried out in separate steps, polyester A being applied in the form of a solution or dispersion and polyester B in powder form. In this embodiment, as described above, first one of the known knotting, weaving, warp-hitting, tufting or needlefelt processes is used to produce from polyester yarns an unconsolidated carpet floor covering comprising a backing and tied-in pile yarns, cropping, if a velour material is to be produced, optionally coloring as usual and then washing to remove existing spin finishes. Then, however, instead of the above-described consolidating and adhering preparation there is applied from the back by spraying, brushing or foaming with or without the addition of a foamer, but preferably by kiss roll padding or knife-coating, merely an optionally thickened solution or dispersion of the following composition:

from 10 to 70 parts by weight, preferably from 15 to 39 parts by weight, of a water-soluble or readily water-dispersible polyester A GW parts by weight of water, GW being given by the formula $$GP \cdot 0.66 \leq GW \leq GP \cdot 5.0,$$

wherein

GP is the amount of polyester A in parts by weight,

GL parts by weight of a water-miscible organic solvent, GL being given by the formula $0 \leq GL \leq 0.3 \cdot GP$.

The amount applied of this polyester solution is adjusted in such a way that the carpet contains at least 2 g/m², preferably at least 6 g/m², in particular from 20 to 560 g/m² of polyester A (solid).

Thereafter the back of the carpet is uniformly besprinkled with a pulverized, water-insoluble polyester B, the amount applied being such that the sum of the weights of polyesters A and B applied per m² of the carpet is from 20 to 800 g and the ratio of the amounts of polyesters A and B applied is between 1:9 and 9:1, polyesters A and B having the above-specified compositions.

Particular preference is given to those embodiments of the present invention that represent a combination of two or more preferred features.

An embodiment of the invention will now be more particularly described by way of example to illustrate the production of a consolidating and adhering preparation and of a recyclable carpet floor covering according to the invention.

EXAMPLE

A) Production of the consolidating and adhering preparation

Into 6.0 kg of a 25% strength by weight solution of a copolyester of isophthalic acid, sulfoisophthalic acid, ethylene glycol and diethylene glycol (sizing agent T 3513 from Hoechst AG) are added with stirring at about 1500–2000 rpm 2.0 kg of a pulverulent copolyester of terephthalic acid, ethylene glycol, cyclohexanedimethanol and polyglycol (®PLATHERM M 1400 B from Elf Atochem) and 640 g of a 30% strength by weight thickener solution based on polyacrylic acid (corresponding to about 2.3% by weight of solids, based on the mixture).

Once a completely homogeneous dispersion of the solids in the aqueous mixture is achieved, the mixture is brought to pH 7.5 with 20% strength by weight aqueous ammonia solution.

In the course of the process the aqueous mixture assumes a pasty form.

B) Production of the recyclable carpet

To the back of a tufted carpet comprising a needle-consolidated spunbonded of unmodified polyethylene terephthalate filaments having a basis weight of 120 g/m² into which a fiber-dyed pile yarn of polyethylene terephthalate (®Trevira from Hoechst AG) has been inserted in such a way as to produce a pile height of 6 mm and the weight proportion of the raw tufted material accounted for by the pile fibers is 900 g/m² is applied by manual doctor 350 g/m² of the polyester paste produced according to section A of this Example.

Thereafter the carpet backing has applied to it a polyester nonwoven having a basis weight of 200 (Hoechst spunbonded type 001) which is firmly pressed in place by means of a roll.

Thereafter the assembly is dried at 120° C. for 15 minutes and then end-consolidated at a temperature of 160° C. for 5 minutes.

The carpet thus produced gives trouble-free recycling by methanolysis or by regranulation. It meets the customary requirements in respect of dimensional stability, light fastness, rub fastness, dry and wet cleanability and thermal stability.

In addition the carpet is odor-neutral and toxicologically safe, and it has an attractive textile appearance and good recovery values.

What is claimed is:

1. A recyclable carpet floor covering comprising a backing, a tied-in pile yarn and a back finish with or without a secondary backing adhered to the (primary) backing, wherein the pile yarn, the (primary) backing and a secondary backing comprise polyester fibers and the back finish for the (primary) backing and for adhering a secondary backing comprises a consolidating and adhering composition comprising a combination of 10–70% by weight of a water-soluble or -dispersible first polyester A, and 90–30% by weight of a water-insoluble second polyester B, wherein the water-soluble or -dispersible polyester A conforms to the formula I

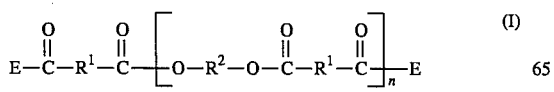

where $R^1$ is on average 25–90 mol % o-, m- or p-phenylene, 10–25 mol % groups of the formulae II or III

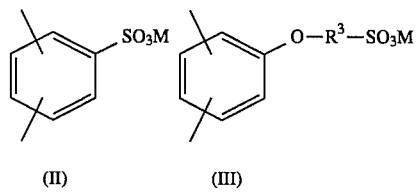

(II)     (III)

where $R^3$ is o-, m- or p-phenylene or straight-chain or branched alkylene of 2–6, carbon atoms, and 0–50 mol % straight-chain or branched alkylene of 1–6, carbon atoms and/or cyclohexylene radicals, $R^2$ is on average 50–100 mol % radicals of the formula IV

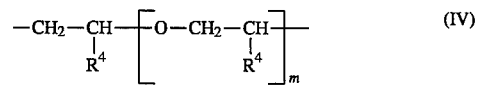

where $R^4$ is hydrogen or methyl and m is 1 or 2, 0–50 mol % alkylene radicals of 2–6 carbon atoms, and 0–20 mol % polyoxyalkylene radicals of the formula IV where $R^4$ is hydrogen or methyl and m is a number corresponding to a number average molecular weight of the polyoxyalkylene radical of up to 2000, E is hydroxyl, alkoxy of 1–4 carbon atoms or the radical— $O$—$R^2OH$, M is hydrogen or a lithium, sodium or potassium atom or an ammonium group, n is such that the number average molecular weight, measured in a vapor pressure osmometer in dimethylformamide as the solvent, is from 1000 to 12,000, and the water-insoluble polyester B conforms to the formula V

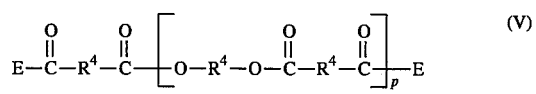

where $R^4$ is on average 50–100 mol % o-, m- or p-phenylene, and 0–50 mol % straight-chain or branched alkylene of 1–6, carbon atoms and/or cyclohexylene radicals, $R^5$ is on average 30–100 mol % radicals of the formula VI

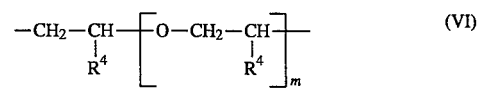

where $R^4$ is hydrogen or methyl and m is 1 or 2, and 0–70 mol % alkylene radicals of 2–6 carbon atoms and/or radicals of the formula VII

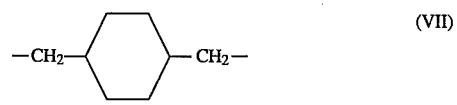

and 0–20 mol % of polyoxyalkylene radicals of the formula IV where $R^4$ is hydrogen or methyl and m is a number corresponding to a number average molecular weight of the polyoxyalkylene radical of up to 2000, E is hydroxyl, alkoxy of 1–4 carbon atoms or the radical—O—$R^2$—OH, and p is such that the second polyester has a melt index of 110°–130° C.

2. The recyclable carpet floor covering of claim 1, wherein the consolidating and adhering composition comprises a combination of 15–30% by weight of a water-soluble or -dispersible first polyester A, and 85–70% by weight of a water-insoluble second polyester B.

3. The recyclable carpet floor covering of claim 1, wherein the weight proportions of pile material, primary backing and consolidating and adhering composition of the carpet floor covering are from about 150 to 2000 g/m² of pile material, from 80 to 200 g/m² of primary backing and from 20 to 800 g/m² of consolidating and adhering composition.

4. The recyclable carpet floor covering of claim 1, wherein the primary backing has a thread density corresponding to from about 60 to 150 warp threads and from 80 to 165 filling threads per 10 cm.

5. The recyclable carpet floor covering of claim 1 having a tufted construction in which the primary backing is a polyester nonwoven or a polyester weave.

6. The recyclable carpet floor covering of claim 1, wherein the secondary backing comprises a polyester nonwoven having a basis weight from 20 to 450 g/m².

7. The recyclable carpet floor covering of claim 1, wherein the fibers are made of a polyester material that is at least 85 mol % polyethylene terephthalate.

8. The recyclable carpet floor covering of claim 1, wherein $R^3$ is o-, m- or p-phenylene or straight-chain or branched alkylene of 2–4 carbon atoms.

9. The recyclable carpet floor covering of claim 8, wherein $R^3$ is o-, m- or p-phenylene or straight-chain or branched alkylene of 3 carbon atoms.

10. The recyclable carpet floor covering of claim 1, wherein $R^1$ is 0–50 mol % straight-chain or branched alkylene of 3–6 carbon atoms.

11. The recyclable carpet floor covering of claim 1, wherein n is such that the number average molecular weight, measured in a vapor pressure osmometer in dimethylformamide as the solvent, is from 1000 to 5000.

12. The recyclable carpet floor covering of claim 1, wherein $R^4$ is on average 50–100 mol % m- or p-phenylene.

13. The recyclable carpet floor covering of claim 1, wherein $R^4$ is 0–50 mol % straight-chain or branched alkylene of 3–6 carbon atoms.

14. The recyclable carpet floor covering of claim 5, wherein the polyester nonwoven or polyester weave has a basis weight from 80 to 200 g/m².

15. The recyclable carpet floor covering of claim 6, wherein the polyester nonwoven of the secondary backing is a nonwoven composed of staple or continuous filament fibers from 2.0 to 30 dtex in linear density.

16. The recyclable carpet floor covering of claim 15, wherein the staple or continuous filament fibers are from 3.0 to 8.0 dtex in linear density.

17. The recyclable carpet floor covering of claim 15, wherein the staple or continuous filament fibers are consolidated by needling, autogenous bonding or hot-melt adhesive.

18. The recyclable carpet floor covering of claim 15, wherein the staple or continuous filament fibers are spunbonded.

* * * * *

UNITED STATES PATENT AND TRADEMARK OFFICE
CERTIFICATE OF CORRECTION

PATENT NO. : 5,472,763
DATED : December 5, 1995
INVENTOR(S) : Gerhard Schwartz et al It is certified that error appears in the above-indentified patent and that said Letters Patent is hereby corrected as shown below:

Column 1, line 5, after "relates" insert -- to --.

Column 1, line 15, change "hit-like" to -- knit-like --.

Column 4, line 54, change "caret" to -- carpet --.

Column 8, line 19, change "warp-hitting" to -- warp-knitting --.

Column 10, line 41 (in Formula V) change "$R^4$" (second occurrence) to -- $R^5$ --.

Signed and Sealed this

Twelfth Day of March, 1996

Attest:

BRUCE LEHMAN

Attesting Officer   Commissioner of Patents and Trademarks